United States Patent
Jurik et al.

(10) Patent No.: US 6,415,680 B1
(45) Date of Patent: *Jul. 9, 2002

(54) STEERING COLUMN WITH LUBRICATED ISOLATOR PAD

(75) Inventors: Mirjana Jurik, Rochester Hills; Rodney L Eaton, Clarkston; Thomas Dziegielewski, Rochester Hills, all of MI (US); Scott D Laney, Toledo; Kurt E Hofmeister, Holland, both of OH (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 17 days.

This patent is subject to a terminal disclaimer.

(21) Appl. No.: 09/629,695

(22) Filed: Aug. 1, 2000

(51) Int. Cl.$^7$ .................................................. B62D 1/16
(52) U.S. Cl. ........................ 74/492; 280/775; 267/141
(58) Field of Search ......................... 74/492, 491, 493, 74/496; 267/141, 153; 248/633, 636, 548, 562; 280/775

(56) References Cited

U.S. PATENT DOCUMENTS

| | | | |
|---|---|---|---|
| 3,832,911 A | * 9/1974 | Daniel et al. ................. | 74/492 |
| 4,517,854 A | * 5/1985 | Kawabata et al. ............ | 74/492 |
| 4,914,970 A | * 4/1990 | Mastrofrancesco et al. ... | 74/492 |
| 4,943,028 A | * 7/1990 | Hoffmann et al. .......... | 248/548 |
| 5,704,254 A | 1/1998 | Thomas et al. | |
| 5,819,592 A | * 10/1998 | Lewandowski et al. ....... | 74/492 |
| 5,960,673 A | 10/1999 | Eaton et al. | |
| 5,979,860 A | * 11/1999 | Jurik et al. .................. | 248/548 |
| 6,062,100 A | * 5/2000 | Sarsfield et al. ............. | 74/492 |
| 6,283,867 B1 | * 9/2001 | Aota et al. ................ | 74/492 X |

* cited by examiner

Primary Examiner—David A. Bucci
Assistant Examiner—Colby Hansen
(74) Attorney, Agent, or Firm—Ralph E. Smith

(57) ABSTRACT

The present invention provides a way in which the coefficient of friction between the steering column and the instrument panel may be lessened when an isolator pad is used. The reduction in friction is accomplished by impregnating the isolator pad with a lubricant.

22 Claims, 4 Drawing Sheets

STEERING COLUMN WITH LUBRICATED ISOLATOR PAD

FIELD OF THE INVENTION

The present invention relates generally to a steering column support structure, and more particularly to an isolator pad for a steering column support structure to reduce or eliminate unwanted noises or vibrations during operation of an automobile.

BACKGROUND

Typically an automobile's steering column is fixedly attached to the instrument panel of the automobile. Though this arrangement provides for secure support of the steering column it can cause undesirable side effects. These side effects include buzz/squeak/rattle (BSR) and noise/vibration/harshness (NVH) which are caused by the motion of the vehicle and the metal to metal contact of the steering column to the instrument panel.

There have been attempts to solve these problems by placing spacers or an isolator pad between the steering column and the instrument panel. Though these inventions have reduced the creation of the BSR and NVH, the coefficient of friction between the steering column and the instrument panel is increased. Since many steering columns are now made collapsible/strokable it is desirable to have a low coefficient of friction between that steering column and the instrument panel so that the collapsing/stroking feature of the steering column is not inhibited.

SUMMARY OF THE INVENTION

It is an object of the present invention to provide a way in which the coefficient of friction between the steering column and the instrument panel may be reduced. According to the invention the isolator pad is impregnated with a lubricant thus assuring that the isolator pad will be lubricated at all times and have a long life.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
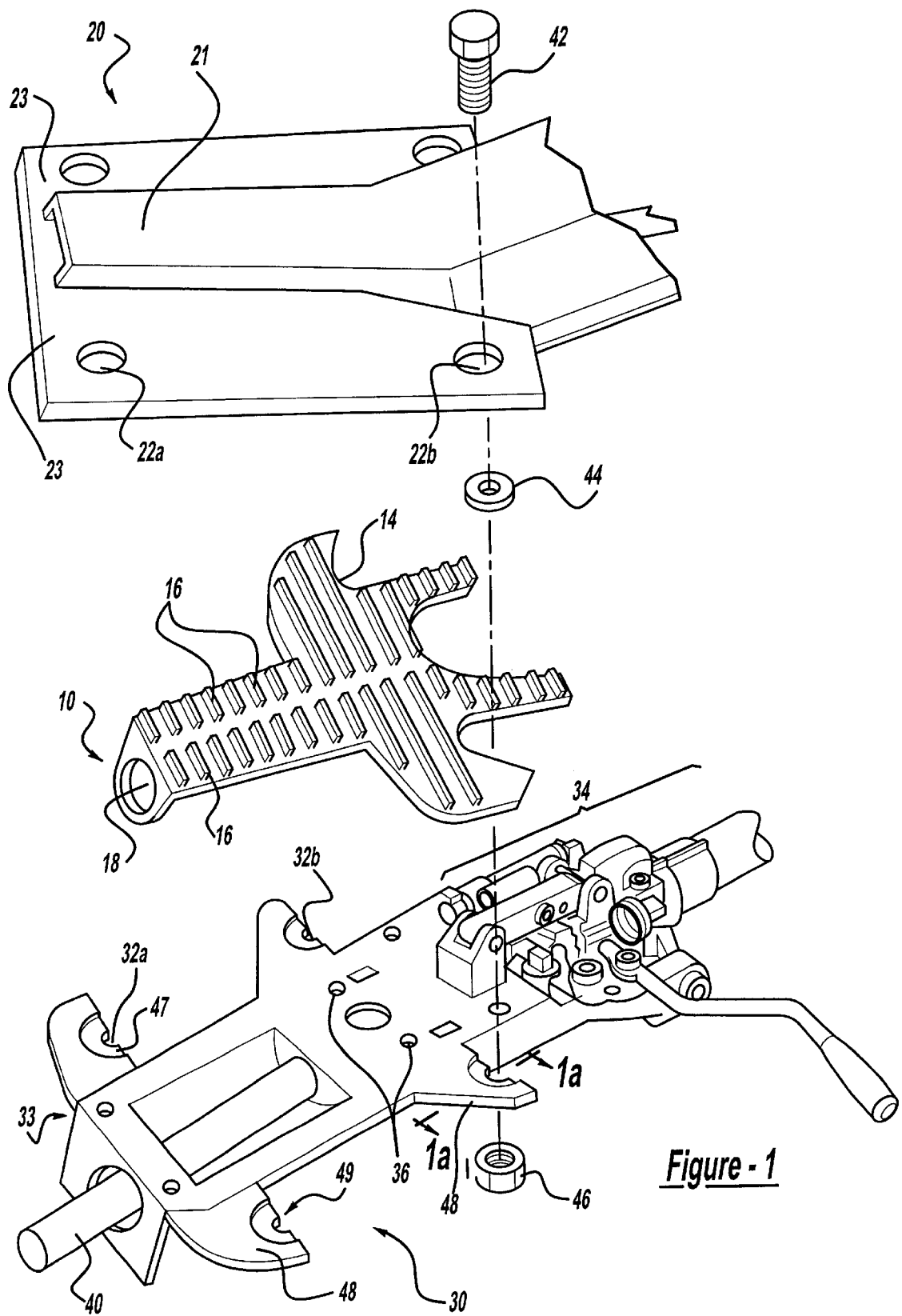
FIG. 1 is an exploded perspective view illustrating the attachment of the isolator pad and the mounting bracket to the instrument panel.

An exploded perspective view of a steering column assembly is shown in FIG. 1 with the isolator pad 10 being disposed between, support bracket 20 of the instrument panel, and mounting bracket 30 of the steering column. The mechanisms shown generally at 34 are for shifting the gears of the automobile and tilting the steering wheel and are shown for orientation purposes only.

The support bracket 20 includes a main body 21 and a flange 23 on either side of the main body 21. Formed in the flanges are forward openings 22a and rearward openings 22b. The openings 22a and 22b receive fasteners, the fasteners include bolts 42 which are secured with nuts 46, which secure the mounting bracket 30 to the support bracket 20.

The mounting bracket 30 includes a main body 33 with a plurality of flanges 48 formed in the sides of the main body 33. The flanges 48 contain a depressed area 47 for receiving a spacer 44. Formed in the depressed area 47 are forward openings 32a and rearward openings 32b which are complimentary to the openings 22a and 22b in the support bracket 20. The main body 33 further contains openings 36 which receive portions of the isolator pad 10 thereby holding the isolator pad 10 in position during assembly. The steering shaft 40 extends through the main body 33 of the mounting bracket 30.

Disposed between the mounting bracket 30 and the support bracket 20 is the isolator pad 10. With continued reference to FIG. 1 and further reference to FIGS. 3 and 4, which demonstrate a top and bottom perspective view of the isolator pad 10 alone, the isolator pad 10 can be seem to be formed of a sheet in generally a T-shape. The T-shape includes a transverse body 13, a longitudinal body 17 perpendicular to and extending in a first direction from the transverse body 13, and two generally parallel longitudinal arms 11 perpendicular to and extending in a second direction from the transverse body 13. Included in the distal ends of the transverse body 13 are molded openings 14. The openings 14 are molded into the isolator pad 10 so as to not obstruct the fasteners 42. The arms 11 of the isolator pad 10 extend rearward of the rearward fastener openings 32b and 22b while the longitudinal body 17 extends forward beyond the forward fastener openings 32a and 22a. Further, the longitudinal body 17 extends beyond the end of the mounting bracket 30 and bends down. Contained with in the bent portion of the longitudinal body 17 is an opening 18 through which the steering shaft 40 may extend. Throughout the surface of the isolator pad 10 are indentations 16 to facilitate compression of the isolator pad 10.

Figure 1A:
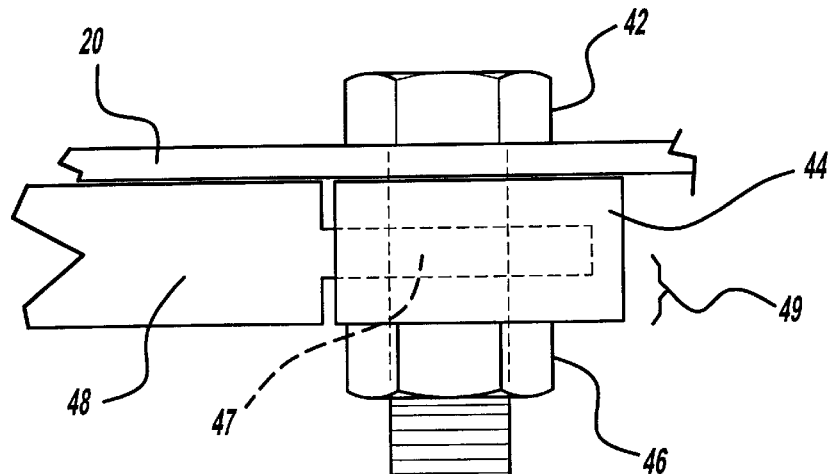
FIG. 1a is a cross-sectional view of a flange of the mounting bracket mounted to the instrument panel.

Turning to FIG. 1a, but with continued reference to FIG. 1, a cross-section of a flange 48 of the mounting bracket 30 fastened to the support bracket 20 is shown. The flange 48 includes a depressed area 47 creating a depression 49. The depressed area 47 contains the unenclosed openings 32a and 32b of the mounting bracket 30. Disposed around the depressed area 47 and in the depression 49 is a spacer 44. Thus when the mounting bracket 30 is fastened to the support bracket 20 the spacer 44 creates the enclosure for the bolt 42 which is secured with a nut 46 thereby creating pressure which affixes the spacer 44 to the depressed area 47. In this way when a force is applied to the mounting bracket 30, through the steering column 40, the spacers 44 will give way, thus reducing the force absorbed by the source of the original force, in the case of an automobile the driver.

Figure 2:
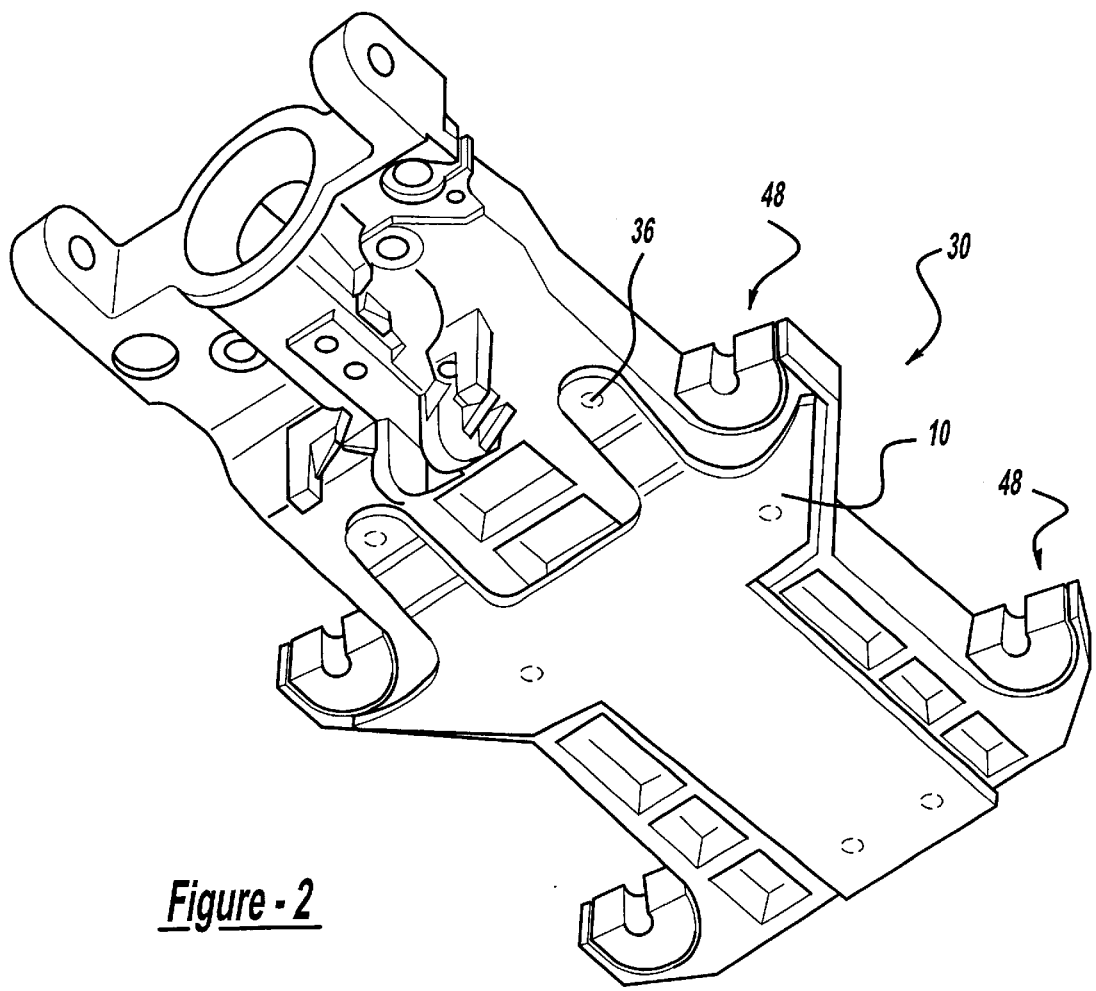
FIG. 2 is a perspective view of the isolator pad assembled to the mounting bracket for a steering column assembly.

FIG. 2 illustrates the isolator pad 10 affixed to the mounting bracket 30 before assembly. Shown in ghost are the openings 36 which receive a portion of the isolator pad 10. With continued reference to FIG. 2, but with further reference to FIG. 4 a bottom perspective view of the isolator pad 10 is shown. Formed into the isolator pad 10 are pegs 12. The pegs 12 extend into the openings 36 of the mounting bracket 30 and hold the isolator pad 10 in placed before the final assembly of the mounting bracket 30 to the support bracket 20. Further, a support structure 19 is formed into the longitudinal portion to assist in rigidity of the isolator pad 10.

Figure 3:
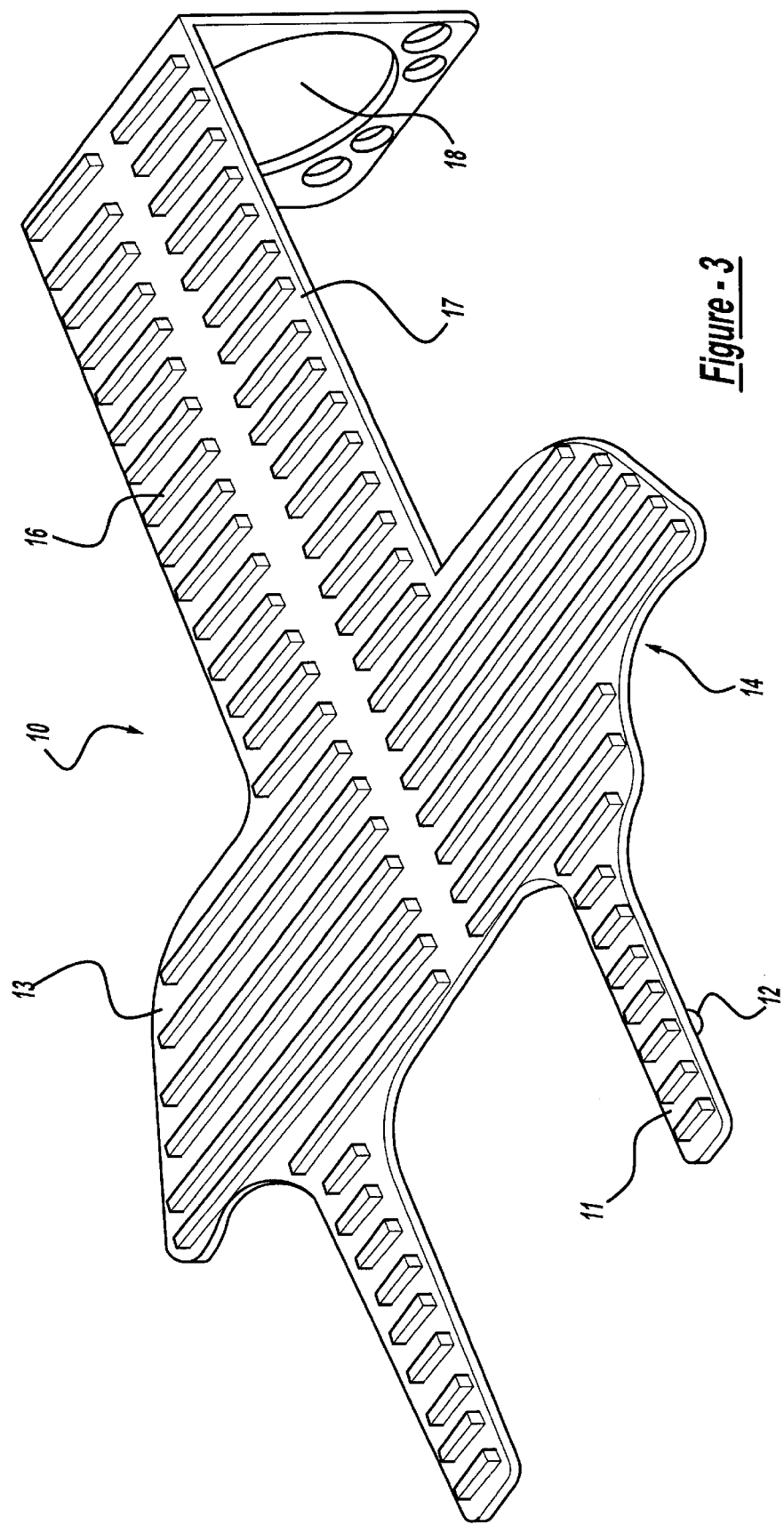
FIG. 3 is a perspective view of the top of the isolator pad.
Figure 4:
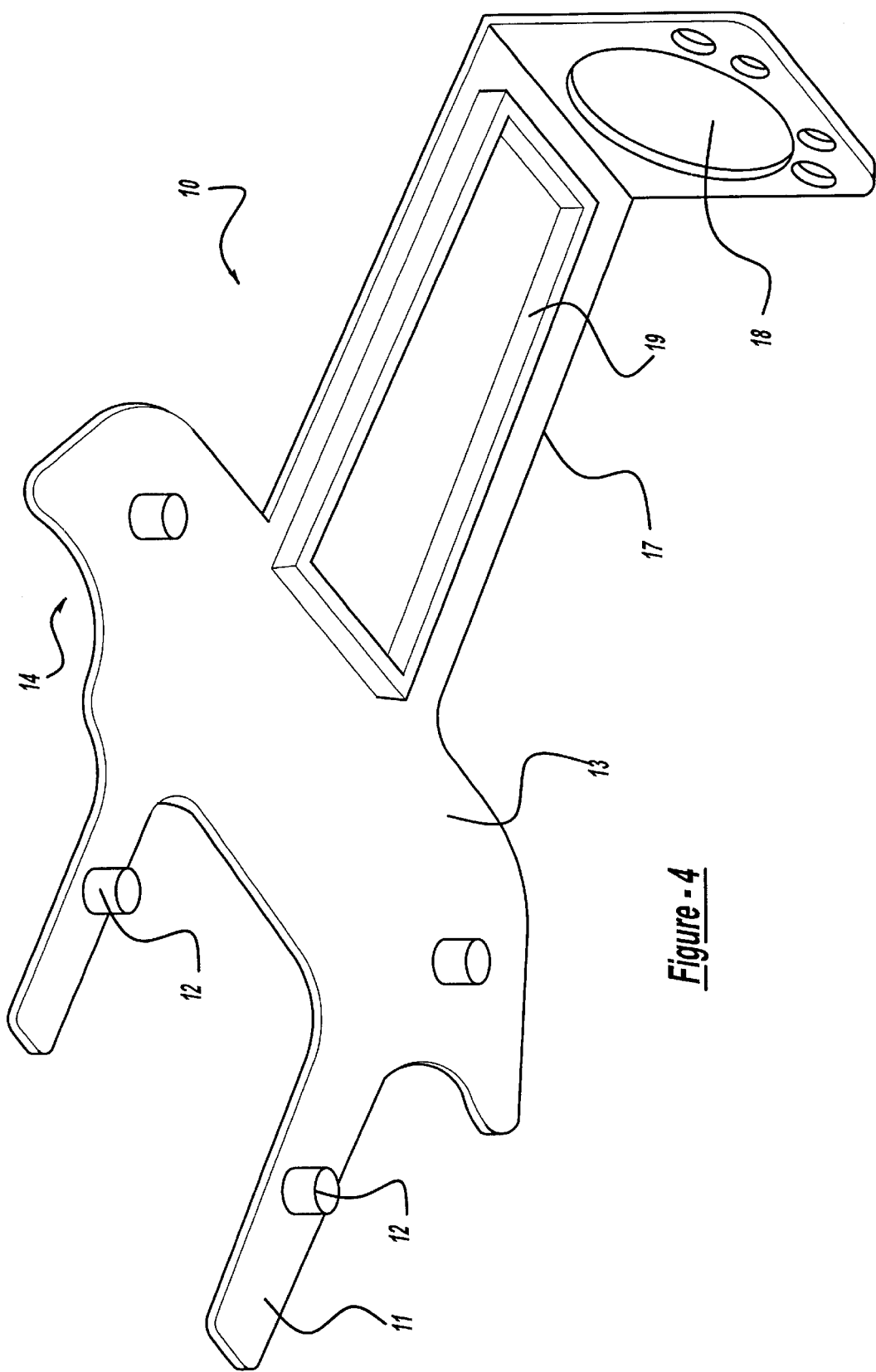
FIG. 4 is a perspective view of the bottom of the isolator pad.

With reference to FIGS. 1, 3, and 4 the isolator pad 10 may be made of several non-skid substances, examples of such substances include resins such as rubber, nylon, or other thermoset or thermoplastic materials. All perform the function of reducing unwanted noises and vibrations during operation of the vehicle, however, they increase the coefficient of friction between the mounting bracket 30 and support bracket 20. Therefore, the isolator pad 10 may be impregnated with a lubricant; this is accomplished by mixing a lubricant with the material from which the isolator pad 10 will be formed. The lubricant may be a wax, Teflon, mineral oil, or a mixture of any of these, however it is preferably wax alone.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An apparatus for supporting a steering column of an automotive vehicle having a vehicle frame, said apparatus dampening vibration of the steering column when the vehicle is in motion, comprising:

support structure secured to the vehicle frame and having a support body and laterally spaced, first and second support openings on opposite sides of said support body;

a bracket secured to the steering column and having a central bracket body and laterally spaced, first and second bracket flanges on opposite sides of said bracket body;

said bracket body being opposed to said support body and said bracket flanges being opposed to said respective support openings, said bracket being securable to said support structure by connecting said bracket flanges to their respective opposite support openings; and an isolator pad, impregnated with a lubricant, between and in surface-to-surface contact with said bracket body and said support body;

said isolator pad having a portion forwardly of said flanges and a portion rearwardly of said flanges.

2. Apparatus as in claim 1, wherein said isolator pad is secured to one of said bodies.

3. Apparatus as in claim 2, wherein said bodies have opposed extending portions located forwardly and rearwardly of said flanges and openings, said isolator pad is in sheet form and a portion thereof extending forwardly and rearwardly of said flanges and openings and between and in contact with said extending portions.

4. Apparatus as in claim 3, wherein said isolator pad is secured to said bracket body.

5. Apparatus as defined in claim 1, wherein said isolator pad is made of an impregnated resinous, plastic material.

6. Apparatus as defined in claim 1, wherein said isolator pad is made of an impregnated rubber material.

7. Apparatus as defined in claim 1, wherein said lubricant comprises a wax.

8. Apparatus as defined in claim 1, wherein said lubricant comprises a mineral oil.

9. Apparatus as defined in claim 1, wherein said lubricant comprises Teflon.

10. Apparatus as defined in claim 1, wherein said lubricant comprises a mixture of Teflon and mineral oil.

11. Apparatus as defined in claim 1, wherein said lubricant comprises a mixture of Teflon and a wax.

12. Apparatus for supporting all elongated steering column of an automotive vehicle having a vehicle frame, said apparatus dampening vibration of the steering column when the vehicle is in motion and also permitting axial collapse of the steering column in a collision, comprising:

support structure secured to the vehicle frame and having a support body and laterally spaced, first and second support openings on opposite sides of said support body;

a bracket secured to the steering column and having a central bracket body and laterally spaced, first and second bracket flanges on opposite sides of said bracket body;

said first bracket flange having a rear edge provided with a first recess and said second bracket flange having a rear edge provided with a second recess;

said bracket body being opposed to said support body and said bracket flanges being opposed to said respective support flanges, said bracket secured to said support structure wherein said first bracket flange is connected to said first support opening with a fastener assembly and said second bracket flange is connected to said second support opening with a fastener assembly;

said fastener assemblies including spacers between said bracket flanges and said support openings;

said fastener assemblies being rearwardly movable out of said recesses, thereby enabling forward movement of said bracket flanges relative to said support flanges and longitudinal collapse of the steering column in the event that the vehicle is subjected to a frontal impact;

an isolator pad, impregnated with a lubricant, between said bracket body and said support body, said isolator pad being secured to said bracket body;

said bracket body and support body having opposed, transversely extending front portions located forwardly of said fastener assemblies and opposed, laterally spaced, longitudinally extending side portions which extend from opposite ends of said front portion rearwardly beyond said fastener assemblies;

said isolator pad being in sheet form between and in surface-to-surface contact with said bracket body and support body to dampen steering column vibration and rocking of said steering column about a transverse axis through said fastener assemblies.

13. Apparatus as in claim 12, wherein said spacers are made of a resinous plastic material.

14. Apparatus as in claim 12, wherein said isolator pad is made of an impregnated resinous plastic material.

15. Apparatus as in claim 14, wherein said isolator pad is compressible, and said isolator pad has surface depressions to increase the compressibility thereof.

16. Apparatus as in claim 15, wherein said depressions are longitudinally spaced, transverse grooves.

17. Apparatus as defined in claim 16 wherein said isolated pad is made of an impregnated rubber material.

18. Apparatus as defined in claim 12, wherein said lubricant comprises a wax.

19. Apparatus as defined in claim 12, wherein said lubricant comprises a mineral oil.

20. Apparatus as defined in claim 12, wherein said lubricant comprises Teflon.

21. Apparatus as defined in claim 12, wherein said lubricant comprises a mixture of Teflon and mineral oil.

22. Apparatus as defined in claim 12, wherein said lubricant comprises a mixture of Teflon and a wax.

* * * * *